April 16, 1946.   E. HEDIGER   2,398,427
ELECTRIC ARC HEATING
Filed Sept. 3, 1943
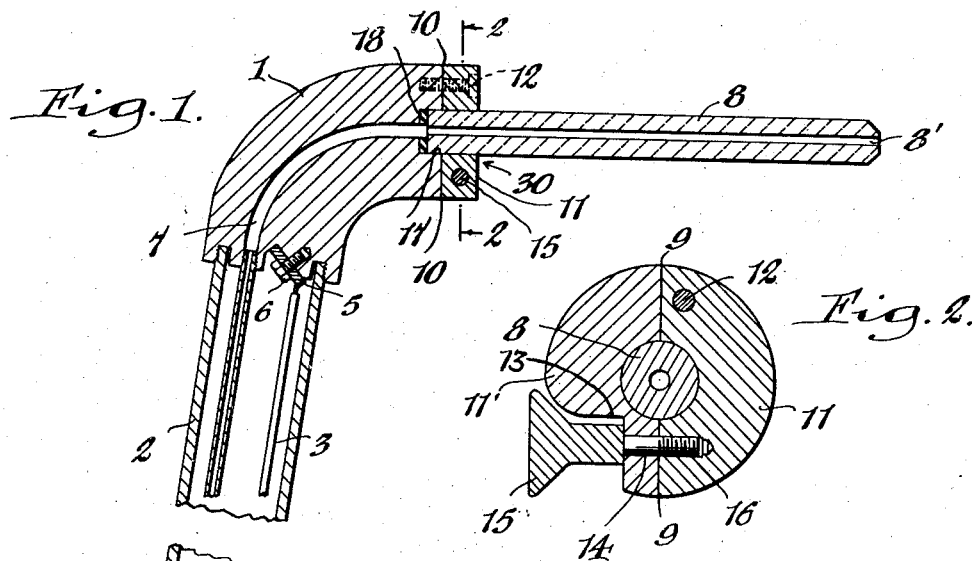
INVENTOR
ERNST HEDIGER
BY
ATTORNEY Patented Apr. 16, 1946

2,398,427

UNITED STATES PATENT OFFICE 2,398,427

ELECTRIC ARC HEATING

Ernst Hediger, Niagara Falls, N. Y., assignor to The Carborundum Company, Niagara Falls, N. Y., a corporation of Delaware Application September 3, 1943, Serial No. 501,084

9 Claims. (Cl. 219—15)

This invention relates to electric arc heating means, more specifically to the novel combination of an electrode and a cutting or welding torch or electrode support, to a novel electrode for such apparatus, and to methods of making said electrode. Among various objects of the invention are to produce more economical efficient electric cutting and welding apparatus, to produce electrodes which have much longer life and are more efficient in operation than prior art electrodes, and to devise simple efficient methods for the production of such electrodes. Other objects of the invention will become apparent as the description proceeds.

The heating of metal, more specifically the cutting or welding of metal, both in the atmosphere and under water, has been accomplished by use of an oxy-acetylene flame. Although the use of such flame is fast and moderately efficient, it shows serious disadvantages when it is used in locations far from the source of compressed acetylene since its use entails large amounts of this gas which must be supplied under high pressure in heavy metal containers. Furthermore, such containers constitute a serious hazard, particularly in areas which are subject to bombardment, since if they are hit by bombs they themselves explode with great force scattering metal fragments for long distances. Much work has therefore been done in an effort to find other fast and efficient metal welding and cutting means, particularly metal welding and cutting means which will function satisfactorily under water without the necessity for using such large quantities of gas. One such means has been the electric arc torch, which, by means of a suitable electrode, creates an arc between such electrode and the metal to be heated, that is, either welded or cut. Such electric cutting and welding means appeared most feasible, particularly in under-water salvage and repair operations, since most ships have electrical apparatus sufficient to supply the current needed for the operation.

When using such apparatus under water, particularly under sea water, however, a very serious disadvantage was found. The life of the electrodes originally employed and of the literally hundreds of the compositions and arrangements of electrodes including refractory non-metallic electrodes and metallic electrodes and torches subsequently tried was very short. In fact, no electrode used prior to the present invention had a total operating life under sea water of more than 30 seconds. Metal electrodes melted down very quickly due to the high temperature of the arc. After being used for such period, and in most cases much less than this period, refractory non-metallic electrodes of low electrical resistance broke off, usually at or near the junction between the electrode and the electrode clamping means on the torch. The reason for this was not then and, in fact, is not now, fully known. It was thought that some chemical interaction occurred between the sea water and the electrode, fostered by the current flowing in the electrode. The chilling action of the water upon the electrode was also thought to have some bearing on the problem. It was not until my invention, however, that an electrode was produced which made the use of under-water cutting and welding operations, particularly those conducted under sea water, economically possible. The average life of electrodes made in accordance with my invention is at least 8 times that obtained from the electrodes heretofore employed when employed in cutting operations under sea water.

Briefly my invention consists of making electric cutting and welding electrodes by employing a highly refractory core of comparatively low electrical resistance, such core having incorporated thereon or therein electrically conducting means of much lower resistance than the core, the latter means being so positioned as to be contacted directly by the means making electrical contact with the electrode and to lead the current along the length of the electrode to a point at or very closely adjacent the arc.

The invention will be more readily understood by reference to the accompanying drawing, in which:

Figure 1 is a view in cross section of an electric under-water cutting torch;

Figure 2 is a view in cross section taken along the line 2—2 in Figure 1;

Figure 3 is a view, partly in cross section, of an electrode clamp portion of an electric under-water cutting torch having mounted therein an electrode made in accordance with the present invention;

Figure 4 is a view in cross section of the electrode in Figure 3 taken along the line 3—3;

Figure 5 is a view in longitudinal cross section of another modification of the electrode of the present invention; and Figure 6 is a view in cross section of the electrode shown in Figure 5 taken along the line 6—6.

In Figure 1 there is shown somewhat diagrammatically an electric torch designed for under-water cutting. It is to be understood that the present invention may be employed for welding as well as cutting, and that the cutting apparatus is described only by way of illustration. The torch shown in Figure 1 consists of a head 1 made, for example, of a metal casting, such head being mounted upon a tube 2 as by a screw thread connection. Tube 2 functions as a part of the handle, and contains the electric cable 3 leading to the electrode and, for cutting operations, the oxygen supplying tube 4. Conduit 3, which is connected to one side of the current supplying circuit, the metal to be cut being made the other side of the circuit, is attached to head 1 of the torch by means of lug 5 and bolt 6. Oxygen tube 4 is connected as by means of a screw thread to a channel duct 7 in head 1 leading to the rear of the electrode. Electrode 8, which in this instance is shown as a prior art refractory non-metallic electrode, is retained in the cutting torch by means of a split clamp arrangement illustrated particularly in Figure 2. The clamp is formed by cutting away the portion of the head at the right hand side of line 9—9 (Figure 2) to the depth indicated by line 10—10 in Figure 1. The clamping jaw 11 is mounted in the place of this cutaway portion by means of bolt 12, on which jaw 11 has a limited pivotal number toward and from the axis of the electrode receiving opening. The portion 11' of head 1, to the left of line 9—9 (Figure 2), has recess 13 cut therein, and hole 14 drilled in the remaining vertical part of said left hand portion thereof for the reception of shank 14 of bolt 15, which has an enlarged head for ease of manipulation. The threaded forward end portion 16 of bolt 15 is threaded and screwed into a correspondingly threaded opening in jaw 11. Jaw 11 may thereby be tightened against the electrode to hold it in place by the tightening of bolt 15. In order to retain the electrode more securely in head 1, and to form a gas-tight connection between channel 7 and the inner end of electrode 8, whereby gas may be conducted to bore 8' of the electrode, there is formed a recess 17 in the head 1, such recess being accurately aligned with the opening between the forward solid portion of the head and jaw 11. Recess 17 is provided at its inner end with a compressible packing member 18, which may be in the nature of a graphite impregnated asbestos washer.

The lower end of tube 2 has attached to it a handle element 19, which may be retained thereon, for example, by metal ring 20 welded to tube 2 and a bottom plate 21 attached to the bottom of tube 2 by means such as screws 22. Bottom plate 21 is equipped with a bushing member 23, through which cable 3 passes, and gas conducting means making connection with the bottom end of tube 4. In the modification shown, this latter means consists of a coupling member 24 threaded on both ends, both interiorly and exteriorly. Top and bottom check nuts 25 and 26, respectively, hold the coupling in place in the opening plate 21. Short threaded pipe 27 is screwed into the lower interior threaded portion of the coupling, and has flexible gas conducting tube 28 attached thereto as by means of clamp 29.

When apparatus such as that shown in Figures 1 and 2 is used in an under-water cutting operation, a heavy current is applied to electrical cable 3, oxygen is allowed to flow through the bore 8' in the electrode by means of channel 7 and tube 4, and the diver then strikes an arc between the outer or working end of the electrode and the metal to be cut. The electrode is then drawn away from the metal for a relatively short distance so that the arc is maintained between electrode and metal and the cutting torch is then traversed slowly across the metal in the direction of cut. The electric arc heats the metal and causes it to melt, and the oxygen delivered to the arc through the hollow electrode causes such molten metal to oxidize and burn, thus effectively removing it from the kerf. As was above explained, prior art highly refractory non-metallic electrodes of low electrical resistance, after a relatively short period of use, developed serious weaknesses at points removed from the working end thereof, and were known to break along the junction between the electrode and the electrode clamping means on the torch or electrode support; such point where breaking usually occurred is designated by the arrow marked 30 in Figure 1. This difficulty of electrode weakening and breaking occurs in under-water electric arc heating operations, whether the electrode is hollow or solid, whether cutting or welding is being done, or whether the heating operation is done by an arc created between an electrode and the workpiece by means of an arc created between two electrodes. The same problem of electrode breakage exists, although not to the same extent, when welding or cutting operations with solid or hollow electrodes are carried out in the air.

The electrode of the present invention, of which that shown in Figure 3 is one modification, overcomes such difficulties and allows the electrode to be used up by the normal eroding effects of the electric arc and not to be broken off before it has been consumed in an effective manner. In Figure 3, the electrode core 30 is shown as being hollow, for under-water cutting, with a central bore 31 therethrough. Such electrode is mounted in a torch having the same parts as the torch shown in Figure 1. As in Figure 1, oxygen is fed to the central bore of the electrode, and the electrode is held by a split clamping means engaging its left hand end, which end is formed to an accurate predetermined diameter. In this modification, the electrode is provided with a sheath of low electrical resistance metal 32, which overlies substantially all the exterior surface of electrode core 30 from its inner clamped end to its working tip. Core 30 may be made of a highly refractory material having relatively low electrical resistance. One such material is graphite, but much better results are obtained by use of material known as "Durhy No. 2," a siliconized silicon carbide product made by the Globar Division of The Carborundum Company. Such material is made by forming a carbon body of the desired shape, said body being open and porous and being composed of a substantial amount of carbon arranged in an open reticular formation. A carbon body having such properties may be made by charring a piece of wood of the desired shape, or it may be made by forming mixtures of carbonizable material such as wheat flour with a suitable carbonizable binder, tamping such mixture into a mold or extruding such mixture through a die having an opening of a suitable cross section and then carbonizing the resulting body. The body may further alternatively be formed by mixing furfural and/or furfuryl alcohol with a suitable acid such as sulphuric or hydrochloric acid, pouring such mixture into a mold having a cavity of the desired shape, allowing an open porous carbon body having the desired reticular carbon structure to form by the interaction of the furfural compound and the acid, and then drying such body. The carbon body of the desired shape resulting from any of these processes is then subjected to the action of silicon vapor at a temperature well above the melting point of silicon. Such siliconizing treatment is conveniently carried out by placing the carbon body on a mass of solid or molten silicon and heating the silicon to a point well above its melting point. As a result of such siliconizing treatment, the recticular carbon structure of the body becomes changed to cubic silicon carbide and the openings or voids between those portions of the body which were originally reticular carbon but are now cubic silicon carbide become filled substantially wholly with elemental silicon. Such product and process are more fully described in the copending application Serial No. 463,832, filed October 29, 1942 by A. H. Heyroth, entitled "Silicon carbide articles and method of making same." The product will henceforth be referred to as siliconized silicon carbide. Preferably in making the core of the electrode body of the present invention a siliconized silicon carbide is used which has a relatively low elemental silicon content and is thus highly resistant to heat shock.

Metal sheath 32 is applied over core 30 which, as explained, is preferably made of siliconized silicon carbide, by a variety of methods. In accordance with one procedure, sheath 32 is deposited by means of the well-known Schoop metal spray gun, the coating being applied in a succession of thin layers, as by traversing the spray gun successively across the length of the electrode while the latter is mounted in and rotated about its axis by suitable means such as a lathe. Because the siliconized silicon carbide has a naturally pitted exterior, and because in this modification the sheath extends completely around core 30, adherence between the core and sheath is excellent. In some cases, however, it might be desirable to provide interlocking means on core 30 as by molding, extruding, or casting the siliconized silicon carbide core with an undercut surface. Such means is necessary if the sheath does not extend completely around the core. Sheath 32 is made, in accordance with the present invention, of a metal having a much lower resistance than core 30 and is preferably made of a metal or alloy having good mechanical strength and a relatively high melting point. Among such metals brass, nickel, aluminum, and iron have been found useful, although it is obvious that the invention is not limited to the use of such above enumerated metals for sheath 32.

Sheath 32 may also be applied to electrode core 30 by a casting operation. This is most conveniently accomplished by means of a vertical mold in which core 30 is positioned vertically and coaxially with the cylindrical cavity therein. Molten metal is then poured into the mold cavity to a height substantially equal to the length of the core and the metal allowed to solidify and shrink securely about the core. A further method which may be used to advantage in certain instances, particularly where core 30 is made initially of a length suitable for the formation of a plurality of electrodes which are subsequently cut off from it, is to extrude coating metal 32 around such long core piece. This may be done by use of apparatus comprising a cylinder and compression piston, the coating metal being placed in the cylinder in either a molten or near molten condition. The outlet from the cylinder leads to an extrusion die having an aperture therethrough of a diameter equal to the diameter of the sheathed core. The long core piece is introduced into the apparatus at the rear of the extrusion die and in a position coaxial with the opening through the die. Upon the application of pressure to the extrusion piston and a suitable feeding forward of the core, the core will issue from the extrusion die with a suitable thickness of coating metal 32 uniformly distributed around it. This process is in general similar to that employed in the metal sheathing of electric cables. After being sheathed by the extrusion process, the long core piece may then be cut traversely into electrodes of suitable lengths.

The low resistance metal sheath may in some instances be applied to the core as a preformed tube. The tube may be made of a size such that when heated it expands sufficiently to allow the telescoping of the core therein, and so that upon cooling of the tube it contracts and embraces the core firmly.

In the particular cutting torch shown, an accurate fit is required between the electrode and the electrode recess 17 in the torch head 1 and the fixed and movable jaws 11' and 11 of the electrode holding means. Consequently it may be necessary to finish the end of the electrode to be inserted in the end of the torch within rather close tolerances. This may be done by mounting the sheathed electrode in a device such as a lathe and turning or grinding such end to dimensions.

It has been found that electrodes made in accordance with any of the above procedures are satisfactory and show the marked advantages over prior electrodes which have been described above. The exact reasons for such improvement in performance are not known, but it is believed that one of the main reasons is the fact that the current applied to the electrode of the present invention in leaving the electric contact means of the welding head does not enter the electrode at points or very small areas as in the case of the electrodes shown in Figure 1. In the apparatus as shown in Figure 1, the portion of the refractory nonmetallic electrode extending into the head and the metal of the torch head surrounding it have a high contact resistance, and thus generate considerable heat. Furthermore, the high current density in the surface of the electrode at the contact causes intense heating in that area. These two factors are additive, and at point 30 reach a maximum, so that extreme temperatures are obtained in the electrode at that point.

In the electrode made according to the present invention, the current flows from the electrical connecting means of torch head 1 into the electrode along low resistance sheath 32. Such sheath has a low electrical resistance and readily conducts the current out to the tip of the electrode where the arc is formed. Thus, there is no localized heating within the electrode by reason of current passage. In addition to the avoidance of hot spots within the electrode, the efficiency of the heating system as a whole is increased, since marked heating occurs only at the point where it is desired, namely, the arc at the tip of the electrode. It should be explained at this point that, the electrode becomes eroded during use and that the metal sheath melts back as core 30 becomes shortened, but that such sheath remains substantially a fixed distance from the end of the electrode until the electrode becomes consumed to a point so near torch head 1 that it is no longer usable. The fact that sheath 32 adds considerable mechanical strength to the electrode possibly also has a bearing on its increased length of life. Sheath 32 also protects all but the tip of the electrode from contact with water, and it may be that this, especially in the case of sea water, which contains a large amount of various dissolved salts, may avoid chemical action which otherwise would occur between the sea water and core 30.

It has, however, been found unnecessary for the means for conducting current from cutting torch head 1 substantially to the tip of the electrode to cover the electrode core completely. It has been found satisfactory to incorporate a sufficient amount of low resistance metal in the core to constitute a low resistance path from the torch head to the working tip of the electrode. For this reason the validity of the last discussed hypothesis as to avoidance of chemical action between the core and water by completely sheathing the core is doubtful. An arrangement such as shown in Figures 5 and 6 wherein an electrode core 33 made of siliconized silicon carbide is provided with a plurality of embedded metal strips 34 has been found to be useful and to display essentially the same advantages as the modification shown in Figures 3 and 4. The electrode shown in Figures 5 and 6 may be conveniently made by forming the core with longitudinal grooves and then filling such grooves with a substantial depth of metal as by spraying or casting. The inherent roughness of the siliconized silicon carbide material is normally sufficient to retain the metal in such grooves, but, if desired, the grooves may be formed undercut, that is, with their bottoms wider than their tops. The disposition of the low resistance metal path for the current in the electrode does not seem to be critical. It can, for instance, be applied as a lining for the bore within the electrode, if the electrode is hollow. Where solid electrodes are used, the metal may be incorporated therein as a central core. It can also be located intermediate between the central bore and the outer surface and be in the form of a tube, straight bars, or one or more spirally wound bars. The modification shown in Figures 3-6, inclusive, however, are preferable, at least with the type of cutting torch shown, because of the ease of connection between the cutting torch and the low resistance metal path positioned on or in the electrode.

Although the apparatus and electrode have been described primarily with reference to an electric arc cutting device, the electrode of the present invention displays the same advantages when it is used in a welding device, particularly one for under-water welding in which the arc is struck between two electrodes and the metal to be melted and deposited is applied as by an automatically fed wire leading into the arc. For under-water welding one electrode may be hollow to supply a desired gas, which creates a gas bubble about the arc, and the other electrode may be solid. It is obvious that although preferred embodiments of the invention have been described, numerous variations within the scope of the invention are possible. The invention is therefore to be defined by the accompanying claims.

I claim:

1. An electrode adapted for use in under-water electrical arc heating apparatus, said electrode comprising a main body of siliconized silicon carbide and a continuous protective sheath of strong material having a much lower electrical resistance than the main body attached to the main body of the electrode and extending longitudinally thereof for substantially the full length thereof, said sheath being of an appreciable thickness and constituting a low resistance path for the current from the point of attachment of an electrical connecting means to at least substantially the working end of the electrode.

2. An electrode for electrical arc heating apparatus, said electrode comprising a main body of siliconized silicon carbide and a continuous sheath of strong material having a much lower electrical resistance than the main body closely interfitting with the main body of the electrode and extending longitudinally of the electrode body for at least a substantial part of the length thereof, said sheath being of appreciable thickness and constituting a low resistance path for the current from the point of attachment for an electrical connecting means to at least substantially the working end of the electrode.

3. An electrode for electrical arc heating apparatus, said electrode comprising a main body of siliconized silicon carbide and a sheath of an appreciable thickness of strong material having a much lower electrical resistance than the main body attached to the main body of the electrode and tightly embracing the main body of the electrode throughout at least substantially all the length of the sheath, said sheath extending longitudinally of the electrode body for at least a substantial part of the length of said body and having one end thereof accurately sized for attachment to an electrical connecting means, said sheath constituting a low resistance path for the current from the point of attachment of the electrical connecting means to at least substantially the working end of the electrode.

4. An electrode for electrical arc heating apparatus, said electrode comprising a main body of siliconized silicon carbide and a metal sheath attached to the main body of the electrode and closely interfitting therewith, said sheath extending longitudinally of the electrode body for at least a substantial part of the length of the body whereby an electrical connecting means attached to the electrode substantially at one end thereof makes contact with such metal sheath, said sheath constituting a low resistance path for the current from the point of attachment of the electrical connecting means to at least substantially the working end of the electrode.

5. An electrode for electrical arc heating apparatus, said electrode comprising an elongated main body of siliconized silicon carbide and a sheath of appreciable thickness made of metal surrounding the main body of the electrode and closely interfitting therewith, said sheath extending longitudinally of the electrode body for at least a substantial part of the length of said body whereby an electrical connecting means attached to the electrode substantially at one end thereof makes contact with such metal sheath, said sheath constituting a low resistance path for the current from the point of attachment of the electrical connecting means to at least substantially the working end of the electrode.

6. An electrode for electrical arc heating apparatus comprising an elongated main body of siliconized silicon carbide, said main body having an aperture longitudinally therethrough for the passage of gas, a sheath of appreciable thickness made of metal on said main body covering and tightly embracing the body for at least a substantial portion of its length, the sheath being so positioned as to allow direct electrical contact with the electrical connecting means for the electrode, said sheath constituting a low resistance path for the current from the electrical connecting means for the electrode to a point substantially at the working end of the electrode where the arc is formed.

7. In an electrical arc heating apparatus adapted for under-water use comprising means for holding an electrode and for making electrical connection to the electrode and means to supply electric current to the electrode holding means, the improved electrode which comprises a main body composed of siliconized silicon carbide and a continuous sheath of strong material having a much lower electrical resistance than the main body closely interfitting with the main body of the electrode and extending longitudinally of the electrode body for at least a substantial part of the length thereof, said sheath being of appreciable thickness, said sheath directly contacting the electrical connecting means and constituting a low resistance path for the current from the electrical connecting means to at least substantially the working end of the electrode.

8. In an electrical arc heating apparatus adapted for under-water use comprising means for holding an electrode and for making electrical connection to the electrode and means to supply electric current to the electrode holding means, the improved electrode which comprises an elongated main body of siliconized silicon carbide and a sheath of appreciable thickness made of metal surrounding the main body of the electrode and closely interfitting therewith, said sheath extending longitudinally of the electrode body for at least a substantial part of the length of said body, one end of said sheath directly contacting the electrical connecting means, said sheath constituting a low resistance path for the current from the point of attachment of the electrical connecting means to at least substantially the working end of the electrode.

9. In electrical arc cutting apparatus adapted for under-water use comprising means for holding an electrode and for making electrical connection to the electrode, means to supply electric current to the electrode holding means and means to supply oxygen under pressure to the electrode holding means, the improved electrode comprising an elongated main body of siliconized silicon carbide and a sheath of appreciable thickness made of metal surrounding the main body of the electrode and closely interfitting therewith, the main body of the electrode having an opening longitudinally therethrough for the passage of oxygen to the arc, said metal sheath extending longitudinally of the electrode body for at least a substantial part of the length of the body, one end of said sheath accurately interfitting with the electrical connecting means whereby said sheath constitutes a low resistance path for the current from the point of attachment of the electrical connecting means to at least substantially the working end of the electrode.

ERNST HEDIGER.